(12) United States Patent
Nakase

(10) Patent No.: US 6,738,169 B1
(45) Date of Patent: May 18, 2004

(54) IMAGE PROCESSING APPARATUS AND METHOD

(75) Inventor: Shiro Nakase, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 823 days.

(21) Appl. No.: 09/615,701

(22) Filed: Jul. 13, 2000

(30) Foreign Application Priority Data

Sep. 10, 1999 (JP) .......................... 11-257704

(51) Int. Cl.[7] .......................... H04N 1/46; H04N 1/41; H04N 1/04; G06K 9/46; G06K 9/32
(52) U.S. Cl. .................. 358/539; 382/239; 382/299; 382/243; 358/445; 358/474
(58) Field of Search ............... 358/539, 445, 358/474; 382/250, 240, 166, 239, 243, 299

(56) References Cited

U.S. PATENT DOCUMENTS

| | | | | |
|---|---|---|---|---|
| 5,724,450 A | * | 3/1998 | Chen et al. .................. | 382/235 |
| 5,818,525 A | * | 10/1998 | Elabd .......................... | 348/268 |
| 5,892,850 A | | 4/1999 | Tsuruoka | |
| 6,453,074 B1 | * | 9/2002 | Zheng ......................... | 382/260 |

FOREIGN PATENT DOCUMENTS

| | | |
|---|---|---|
| JP | 9-74488 | 3/1997 |
| JP | 9-130606 | 5/1997 |

* cited by examiner

Primary Examiner—Edward Coles
Assistant Examiner—Jason Sherrill
(74) Attorney, Agent, or Firm—Finnegan, Henderson, Farabow, Garrett & Dunner, L.L.P.

(57) ABSTRACT

In a high-frequency component processing section, a low-quality color transformation section applies a very simple (meaning a small amount of calculations) color transformation to an original image as required and a high-frequency component calculation section then applies out frequency transformation thereto. In a low-frequency component processing section, an LPF (Low-Pass Filter) and a sampling process executed by a sub-sampling section cooperate in sub-sampling the original image to obtain a reduced image with a small number of pixels. A high-quality color transformation section applies an advanced (meaning a large amount of calculations) color transformation to the reduced image. Then, a low-frequency component calculation section applies frequency transformation to the reduced image, which has been subjected to the color transformation. The values obtained by this frequency transformation are sent to the combine section and used as low-frequency coefficient with frequency coefficient obtained by the high-frequency component calculation section.

13 Claims, 11 Drawing Sheets

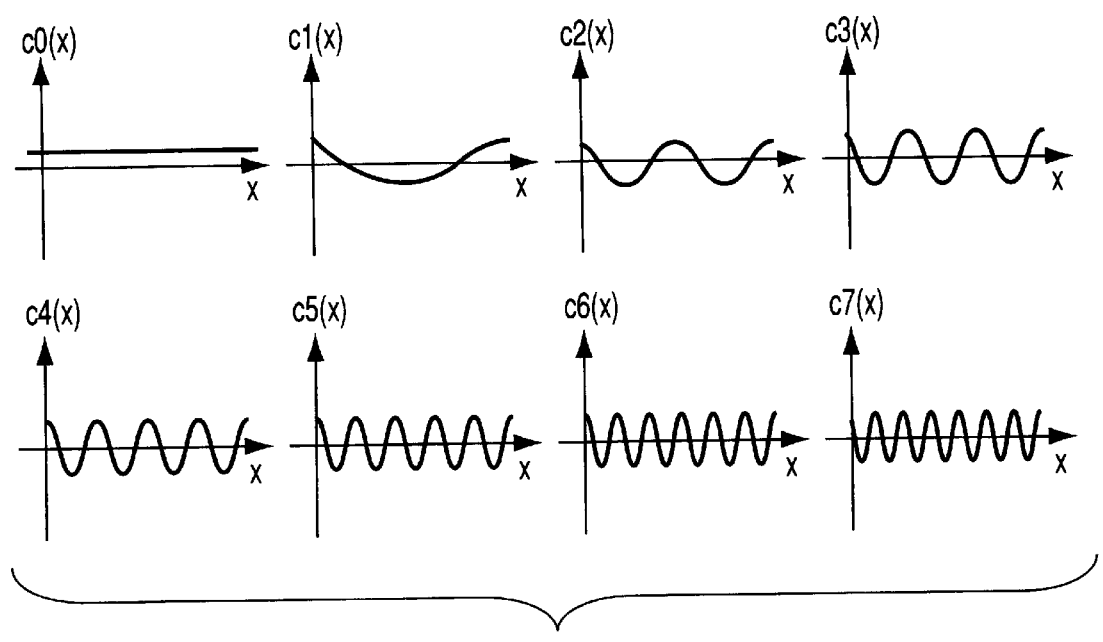
F I G. 2

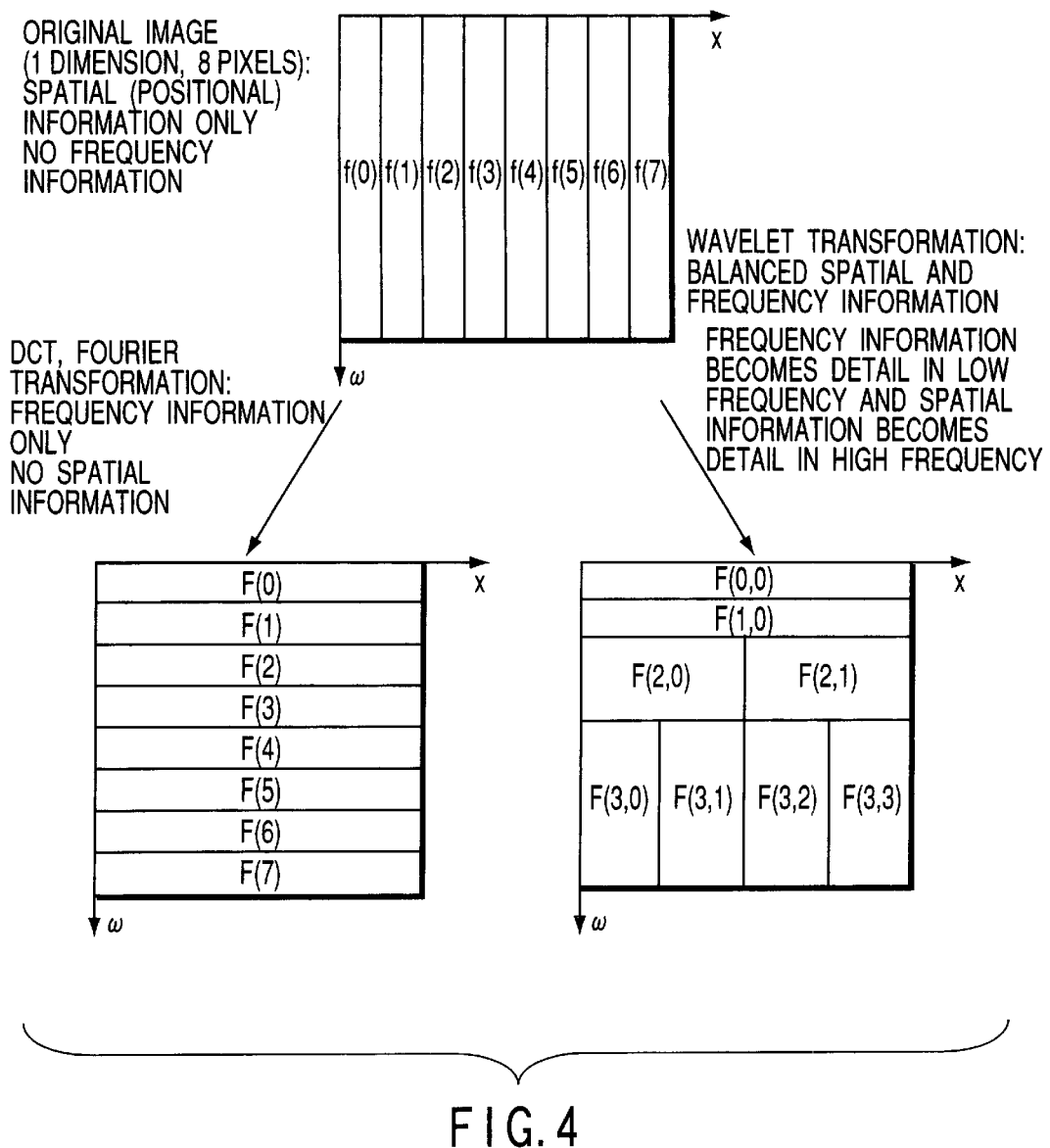
F I G. 4

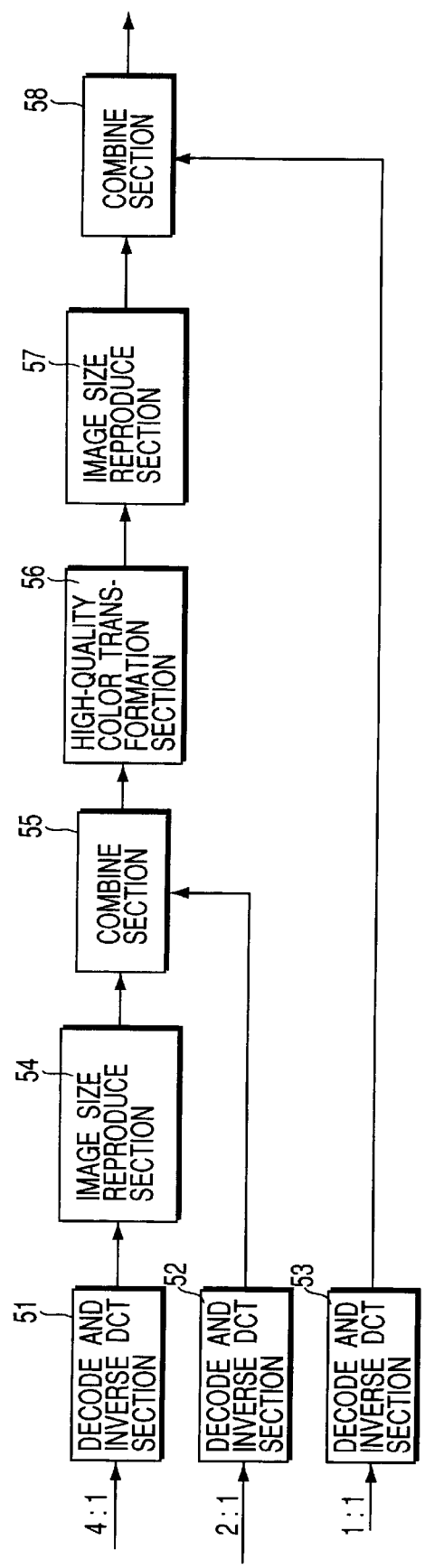
F I G. 10

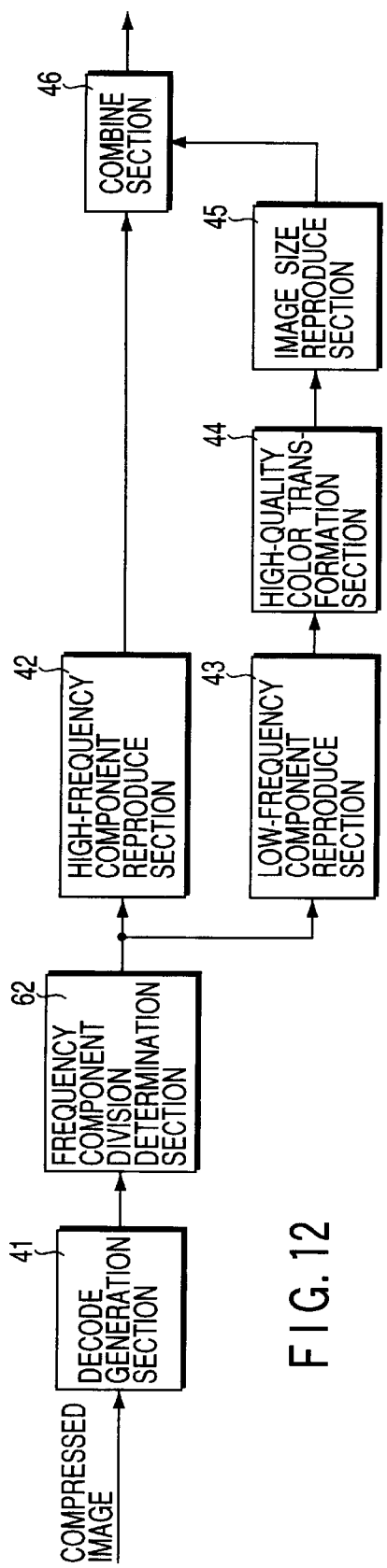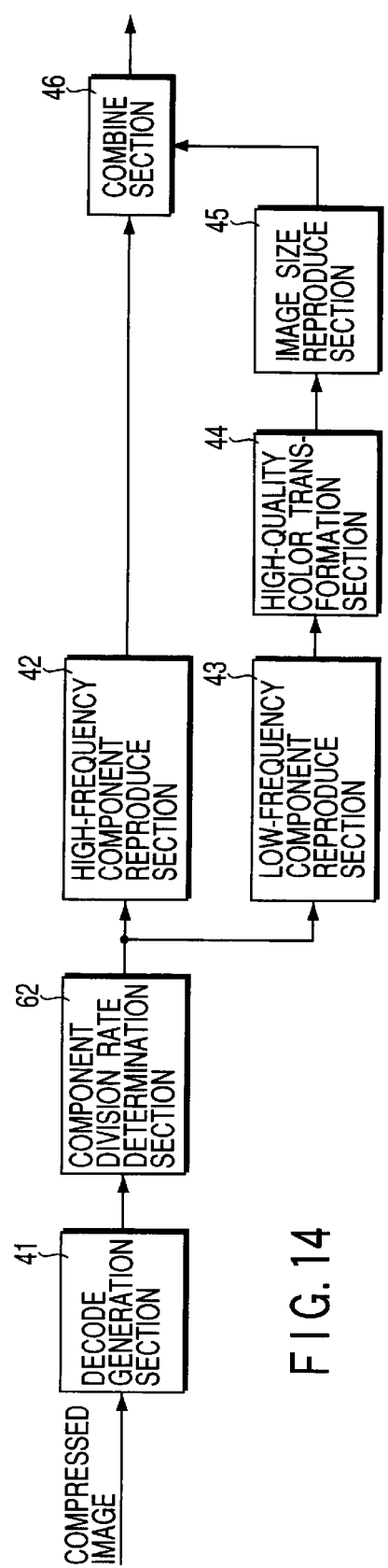

IMAGE PROCESSING APPARATUS AND METHOD

CROSS-REFERENCE TO RELATED APPLICATIONS

This application is based upon and claims the benefit of priority from the prior Japanese Patent Application No. 11-257704, filed Sep. 10, 1999, the entire contents of which are incorporated herein by reference.

BACKGROUND OF THE INVENTION

The present invention relates to an image processing apparatus and method having the function of executing color transformation processing on image data depending on an I/O device or the like.

In general, an image I/O apparatus such as a color printer, a color display, a color scanner cannot directly use RGB signals or the like from an original image due to the variation of the physical characteristics of these apparatuses, so that color transformation must be performed before input or output depending on the characteristics of each apparatus.

Color transformation is also executed simply to make a user's face look attractive, for example, to add a tinge of red to the flesh color so that the face appears beautiful. Actually, in most cases, color space transformation is further performed, for example, to transform RGB (Red, Green and Blue) into CMY (Cyan, Magenta, Yellow).

In general, simple linear transformation is insufficient to obtain high image quality by means of the above transformation, so that a combination of a color transformation table and a multi-dimensional equation is used. Color transformation methods are roughly divided into the following three types:

(a) transformation based on an equation,
(b) transformation based on transformation table look-up (LUT), and
(c) transformation based on a combination of transformation table look-up and equations.

The simplest example of the transformation based on an equation is a one-dimensional transformation equation as shown below:

$$\begin{bmatrix} R' \\ G' \\ B' \end{bmatrix} = \begin{bmatrix} a\,rr & a\,rg & a\,rb \\ a\,gr & a\,gg & a\,gb \\ a\,br & a\,bg & a\,bb \end{bmatrix} \begin{bmatrix} R \\ G \\ B \end{bmatrix} \quad (1)$$

That is, a one-dimensional equation for the value of each color (R, G, B) in an original pixel is multiplied by a transformation coefficient to obtain corrected pixel values (R', G', B').

Although the amount of calculations in Equation (1) is 9 in terms of the number of multiplications, these calculations must be applied to all (N) pixels, thereby requiring 9N multiplications in total.

To meet actual needs for color transformation that is sufficient for all points on a color space, high-order items must be introduced because the above one dimensional transformation provides an insufficient image quality, resulting in a significant increase in the amount of calculations required.

For example, even the simple introduction of a two-order item requires 27 multiplications per pixel.

$$\begin{bmatrix} R' \\ G' \\ B' \end{bmatrix} = [3 \times 9 \text{ matrix}] \begin{bmatrix} R \\ G \\ B \\ R^2 \\ G^2 \\ B^2 \\ RG \\ GB \\ BR \end{bmatrix} \quad (2)$$

In practice, this is often still insufficient, and the color transformation based only on an equation is thus rarely employed.

(b) Table Look-up Method

The table look-up method references a table in which color transformation is individually defined for all colors.

This method has the advantage of enabling every transformation, while having the disadvantage of requiring an enormous table size. For example, a 24-bit color space requires $2^{24} \times 24$ bits, that is, 48 MBytes of table.

(c) Transformation Based on Transformation Table Look-up and Equations

This method provides a transformation table for representative colors sampled on a color space (for example, points that evenly divide each of R, G, and B into 16 pieces or the like) and calculates the other colors from several representative colors in the neighborhood using an equation.

This method requires a small table size and a small area to be interpolated by an equation, thereby enabling appropriate color transformation with a relatively simple equation.

This method is actually often employed and various methods have been proposed including a color space division method, a neighborhood point selection method, and an interpolation method. This method, however, also involves at least several multiplications/divisions for all pixels and thus does not eliminate the disadvantage of requiring a large amount of calculations. Accordingly, a faster method is desired.

Recently, a compression method such as the JPEG has been used, for example, to reduce the image data size. The JPEG (Joint Photographic Coding Expert Group) is a method for compressing multi-gradient images (including color images) which has been standardized by ISO (International Standards Organization) and ITU (International Telecommunication Union).

However, image compression and color transformation are treated as totally different techniques, and in practical applications, these techniques are sequentially used for processing as follows:

Output system: compressed image→(expansion)→ original image→(color transformation)→output image Input system: input image→(color transformation)→ original image (compression)→compressed image For example, printers perform such sequential processing by (1) expanding a JPEG-compressed image and (2) executing color transformation to this image for output.

If image compression and expansion is performed separately from color transformation, the color transformation process requires a large amount of time because it is used for raw image data obtained before compression or after expansion and having a large number of pixels. Image I/O processing further includes an amount of time required for the compression and expression processes, thereby requiring a vast amount of time.

BRIEF SUMMARY OF THE INVENTION

The present invention is provided in view of these circumstances, and it is an object of the present invention to provide an image processing apparatus and method that can reduce the number of color transformation target pixels without significantly degrading image quality and that can enable very fast processing.

In order to attain this object, according to a first aspect of the present invention, there is provided an image processing apparatus comprising reduced image production means for producing reduced image data from original image data; color transformation means for transforming color of the reduced image data obtained by the reduced image production means; first frequency transformation means for executing frequency transformation to the reduced image data subjected to color transformation by the color transformation means in order to determine low-frequency coefficient of the original image data; second frequency transformation means for executing frequency transformation to the original image data to determine high-frequency coefficient of the original image data; means for combining the low-frequency coefficient determined by the first frequency transformation means and the high-frequency coefficient determined the second frequency transformation means in order to generate frequency coefficient of the original image data; and coding means for coding the generated frequency coefficient of the original image.

The processing executed by this image processing apparatus is divided into a process for determining low-frequency coefficient and a process for determining high-frequency coefficient. The process for determining low-frequency coefficient comprises executing color transformation on a reduced image obtained by sub-sampling and having a smaller number of pixels and then subjecting the color-transformed image to frequency transformation (orthogonal transformation) based on the DCT (discrete cosine transformation) or Wavelet transformation so that frequency coefficient of the reduced image obtained by the frequency transformation are determined as the low-frequency coefficient. On the other hand, the process for determining high-frequency coefficient comprises directly executing transformation to original image data without executing the color transformation process so that frequency coefficient obtained by the frequency transformation are determined as the high-frequency coefficient of the original image. Then, by combining the low- and high-frequency coefficient together, frequency coefficient of the original image are determined which covers both the low and high frequencies. This combine process can be easily implemented, for example, by executing frequency transformation to original image data without color transformation to obtain 8×8 DCT coefficients and replacing a frequency coefficient obtained from a reduced image for some of the DCT coefficients and which constitute the low-frequency component.

With this simultaneous compression and color transformation processing of separately subjecting the low- and high-frequency component sides to the frequency transformation process and executing color transformation only to the low-frequency components, which more significantly affect image quality, without executing color transformation on the high-frequency components, the number of color transformation target pixels can be reduced to increase the processing speed without seriously degrading image quality.

In addition, according to a second aspect of the present invention, there is provided an image processing apparatus comprising means for decoding compressed and coded image data to obtain frequency coefficient of the compressed and coded image data; first image data generation means for executing inverse frequency transformation to low-frequency coefficient of the obtained frequency coefficient of the compressed and coded image data to generate reduced image data; color transformation means for executing color transformation on the reduced image data obtained by the first image data generation means; image data size reproduce means for reproducing the reduced image data subjected to the color transformation by the color transformation means, to a size of the original image data; second image data generation means for executing inverse frequency transformation to the frequency coefficient of the compressed and coded image data other than the low-frequency coefficient to generate image data; and means for combining the image data obtained by the image size reproduce means with the image data obtained by the second image data generation means in order to generate a decoded image of the compressed and coded image data.

Thus, in expanding a compressed and coded image, the number of color transformation target pixels can also be reduced to increase the processing speed without degrading image quality, using the above simultaneous expansion and color transformation processing method of using the separate inverse frequency transformation processes for the low- and high-frequency component sides and executing color transformation only to the low-frequency components, which more significantly affect image quality, without executing color transformation on the high-frequency components.

The boundary for dividing the frequency coefficient of the image data into the low- and high-frequency sides may be fixedly determined beforehand. When, however, it is determined whether or not any of the high-frequency components has a higher level than a predetermined threshold and if so, then the function of dynamically changing the boundary depending on the spatial position of this frequency coefficient is desirably provided. This function can reduce the effects of color transformation errors originating from the lack of the color transformation of the high-frequency components, thereby providing higher-quality images.

In addition, in decoding image data coded by hierarchical mode, the processing speed can be increased without degrading image quality, using simple processing for executing color transformation to decoded image data obtained from low-resolution image data without the color transformation of decoded image data obtained from high-resolution image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a diagram for describing example of base functions for the DCT for use in the image processing apparatus according to the first embodiment;

FIG. 4 is a diagram for describing the characteristics of the Wavelet transformation for use in the image processing apparatus according to the first embodiment;

FIG. 10 is a block diagram showing an example of a configuration of an image processing apparatus according to a third embodiment of the present invention;

FIG. 12 is a block diagram showing an example of a configuration of an image processing apparatus according to a fourth embodiment of the present invention;

FIG. 14 is a block diagram showing an example of a configuration of an image processing apparatus according to a fifth embodiment of the present invention.

DETAILED DESCRIPTION OF THE INVENTION

The embodiments of the present invention will be described below with reference to the drawings.

First Embodiment

Figure 1:
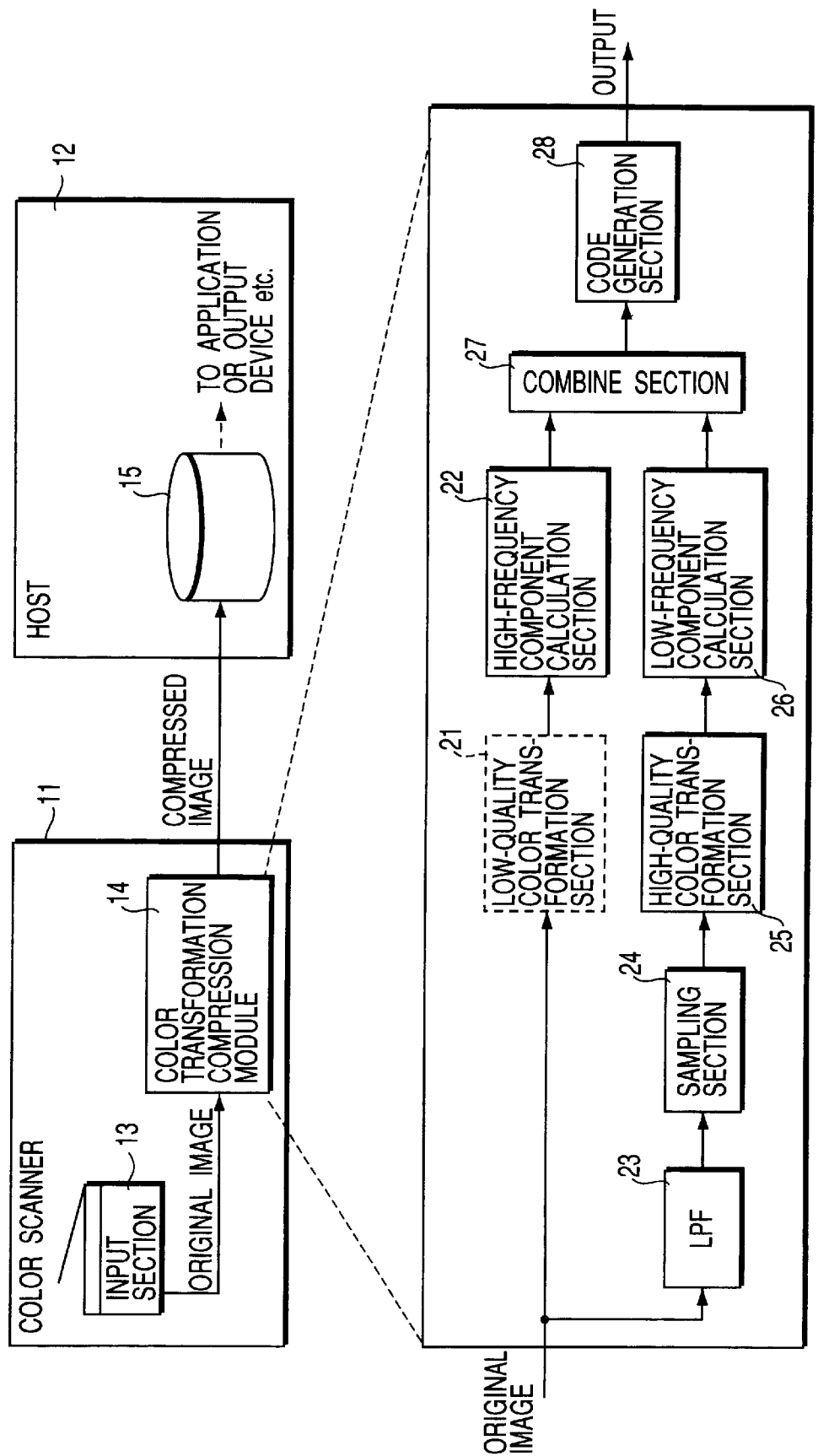
FIG. 1 is a block diagram showing an example of a configuration of an image processing apparatus according to a first embodiment of the present invention.

FIG. 1 shows a configuration of an image processing apparatus according to a first embodiment of the present invention. A color scanner system will be illustrated and described which is comprised of a scanner 11 and a host computer 12. Color image data read by a mechanical section 13 of a color scanner 11 is transmitted to a color transformation and compression module 14 as original image data to be processed, where a color transformation and compression process is executed for simultaneous color transformation and compression. The color transformation process includes color transformation for color corrections that are compatible with the device characteristics of the color scanner 11, color transformation for obtaining images that meet a user's liking. In addition, the compression process comprises compressing and coding image data by means of a compression method based on the JPEG or the like.

Compressed image data obtained by the color transformation and compression module 14 is transmitted to a host computer 15 via a recording or communication medium, where the data is stored in a disk device 15 or the like in the host computer 15. The compressed image data recorded on the disk device 15 is output to an output device. The color transformation and compression module 14 may reside on the host computer 12 side.

With the color transformation and compression process executed by the color transformation and compression module 14, in compressing an image using frequency control (the DCT, Wavelet transform, or the like), the following method is used: When high-frequency components are calculated, the value of an input image is not subjected to color transformation or very simple transformation is used. On the other hand, when low-frequency components are calculated, the number of pixels is reduced using an LPF (Low Pass Filter) and sub-sampling for reducing the number of pixels, sub-sampled reduced image is subjected to the color transformation process. Finally, typical calculations are performed on the image obtained.

JPEG

Figure 3A:
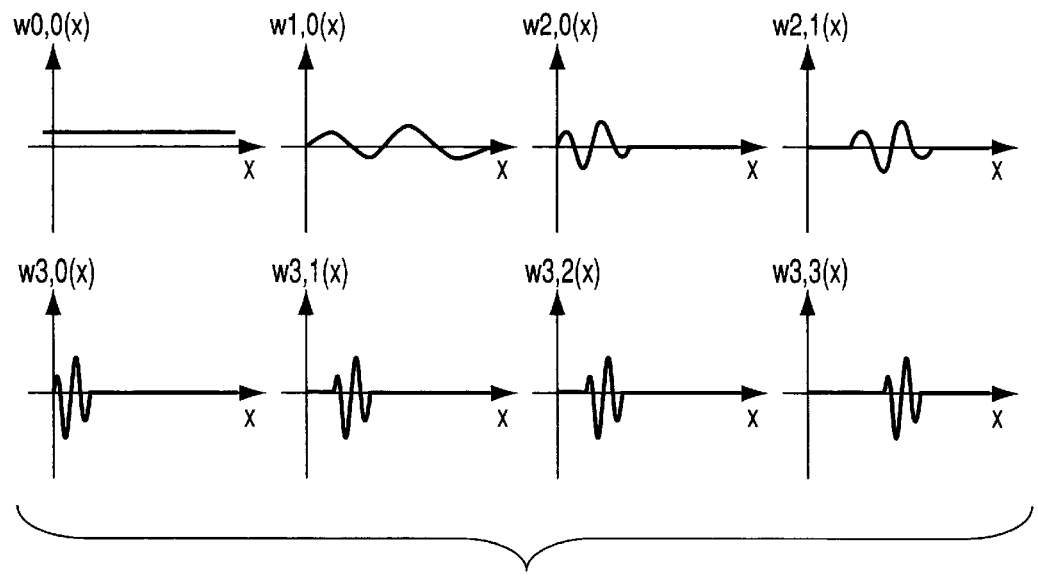
FIGS. 3A and 3B are diagrams for describing base functions for the Wavelet transformation for use in the image processing apparatus according to the first embodiment.
Figure 3B:
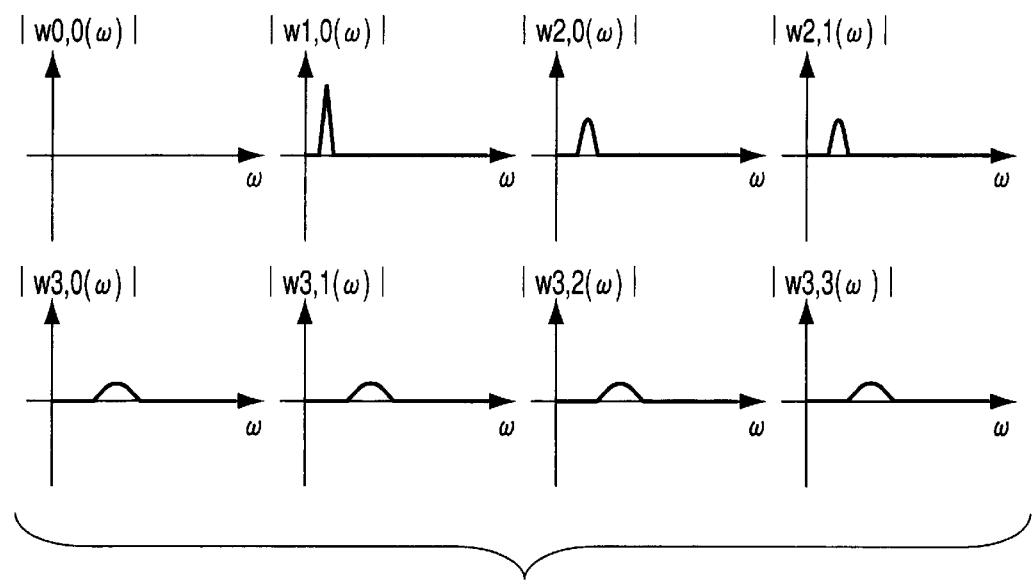

Then, the principle of the image compression process using frequency transformation (the DCT, Wavelet transform, or the like) will be described using FIGS. 2, 3A, and 3B. FIG. 2 shows base functions for the DCT (in the case of one dimension and eight pixels), FIG. 3A shows base functions for the Wavelet transformation (in the case of one dimension and eight pixels) as an example, and FIG. 3B shows a base frequency spectrum as an example.

As described above, the JPEG is a compression method for multi-gradient images (including color images) which employs as a basic method the DCT (Discrete Cosine Transform), which is a frequency transformation (an orthogonal transformation). Frequency transformation transforms an original image that is a collection of levels relative to spatial "positions" into a collection of levels for each "degree of change". That is, this method divides the original image into the sum of "low-frequency components" representing slower changes (more leftward functions in the upper part of FIG. 2) and "high-frequency components" representing rapid changes (more rightward functions in the lower part of FIG. 2) and expresses the image as a collection of coefficients applied to each group of frequencies.

The following two points are principle reasons for the use of frequency transformation for image compression:

(a) When a natural image has its frequency transformed, high levels concentrate on low-frequency components, while high-frequency components have a level close to zero level. By using this nature to code continuous zeros in a run length manner, a compression effect can be obtained.

(b) As a visual characteristic, human beings do not virtually notice missing high-frequency components. Accordingly, no practical problem occurs even if high-frequency components are substantially quantized to reduce the amount of information therein. In addition, this quantization converges all the values close to zero at zero to further improve the effect in (a). (Hierarchical mode)

The JPEG defines a hierarchical mode as an option for improving image quality.

In order to reduce the amount of calculations, the JPEG divides an image into blocks each consisting of 8×8 pixels and applies the DCT to each block. Consequently, an increase in compression rate may result in block noise, which in turn makes one block appear to be one pixel. In the hierarchy mode, compression is performed by using following procedure to suppress the block noise:

(1) An appropriate LPF is applied to an original image, which is then sub-sampled in the ratio of 4:1 both in the vertical and horizontal direction to produce a reduced image of a 1/16 size.

(2) The resulting 1/16 reduced image is divided into blocks of 8×8 pixels each, which are then subjected to the DCT for compression. As a result, a low-resolution (4:1) compressed image is obtained.

(3) A differential image is formed from the original image and an image obtained by reproducing the 1/16 reduced image to the original size. This differential image is then subjected to an appropriate LPF and sub-sampled in the ratio of 2:1 both in the vertical and horizontal directions to produce a reduced image of a 1/4 size. Thus, a 2:1 compressed image is obtained.

(4) A differential image is formed from the original image and an image obtained by reproducing the 1/4 reduced image to the original size. This differential image is then similarly subjected to the DCT for compression. As a result, a high-resolution (1:1) compressed image is obtained.

The above process substantially processes blocks of 32×32 pixels, thereby reducing the block noise.

Image Compression Using the Wavelet Transformation

Although not supported by the current JPEG, it is studied that the Wavelet transformation will employ instead of the DCT.

The Wavelet transformation selects, instead of cosine waves, functions having a high localizability in terms both of the space and frequency as shown in FIGS. 3A and 3B, and uses base functions comprised of scaling and shifts in the selected functions.

Coefficients for the DCT are characterized to have only frequency components, while coefficients for the Wavelet transformation are characterized to have a large amount of frequency information on low-frequency components and a large amount of space information (locational information) on high-frequency components. FIG. 4 shows a diagram for intuitively understanding the abilities of an original image, the DCT, and the Wavelet transformation to resolve space and frequency information.

The Wavelet transformation allows the compression rate to be improved and restrains an increase in the amount of calculations for transformation even with an increase in target pixels, compared to the DCT, thereby eliminating the need to explicitly divide the image into blocks.

Color Transformation and Compression Module

Next, the configuration of the color transformation and compression module 14 in FIG. 4 will be explained.

As shown in FIG. 1, the color transformation and compression module 14 is comprised of a low-quality color transformation section 21, a high-frequency component calculation section 22, an LPF 23, a sub-sampling section 24, a high-quality color transformation section 25, a low-frequency component calculation section 26, a combine section 27, and a code generation section 28. A frequency transformation process is divided into a high-frequency component side and a low-frequency component side. The low-quality color transformation section 21 and the high-frequency component calculation section 22, which are shown in the upper part of the figure, constitute a section for processing high-frequency components. The low-quality color transformation section 21 is provided as required and may be omitted. The LPF 23, the sub-sampling section 24, the high-quality color transformation section 25, and the low-frequency component calculation section 26, which are shown in the lower part of the figure, constitute a section for processing low-frequency components.

An original image is passed both to the section for processing high-frequency components (upper part) and to the section for processing low-frequency components (lower part). In the high-frequency component processing section, the low-quality color transformation section 21 applies a very simple (meaning a small amount of calculations) color transformation to the original image as required and the high-frequency component calculation section 22 then applies frequency transformation thereto.

In the low-frequency component processing section, the LPF (Low-Pass Filter) 23 and a sampling process executed by the sub-sampling section 24 cooperate in sub-sampling the original image to obtain a reduced image with a small number of pixels. The high-quality color transformation section 25 applies an advanced (meaning a large amount of calculations) color transformation to the reduced image. Then, the low-frequency component calculation section 26 applies frequency transformation to the reduced image, which has been subjected to the color transformation. The values obtained by this frequency transformation are sent to the combine section 27 as low-frequency coefficient.

The combine section 27 combines high-frequency coefficient, which have been obtained by the high-frequency component calculation section 22, with the low-frequency coefficient, which have been obtained by the low-frequency component calculation section 26, to obtain frequency coefficient of the original image including both the high- and low-frequency coefficient. Then, the code generation section 28 applies quantization and variable coding to the obtained values to generate a compressed image.

Figure 5:
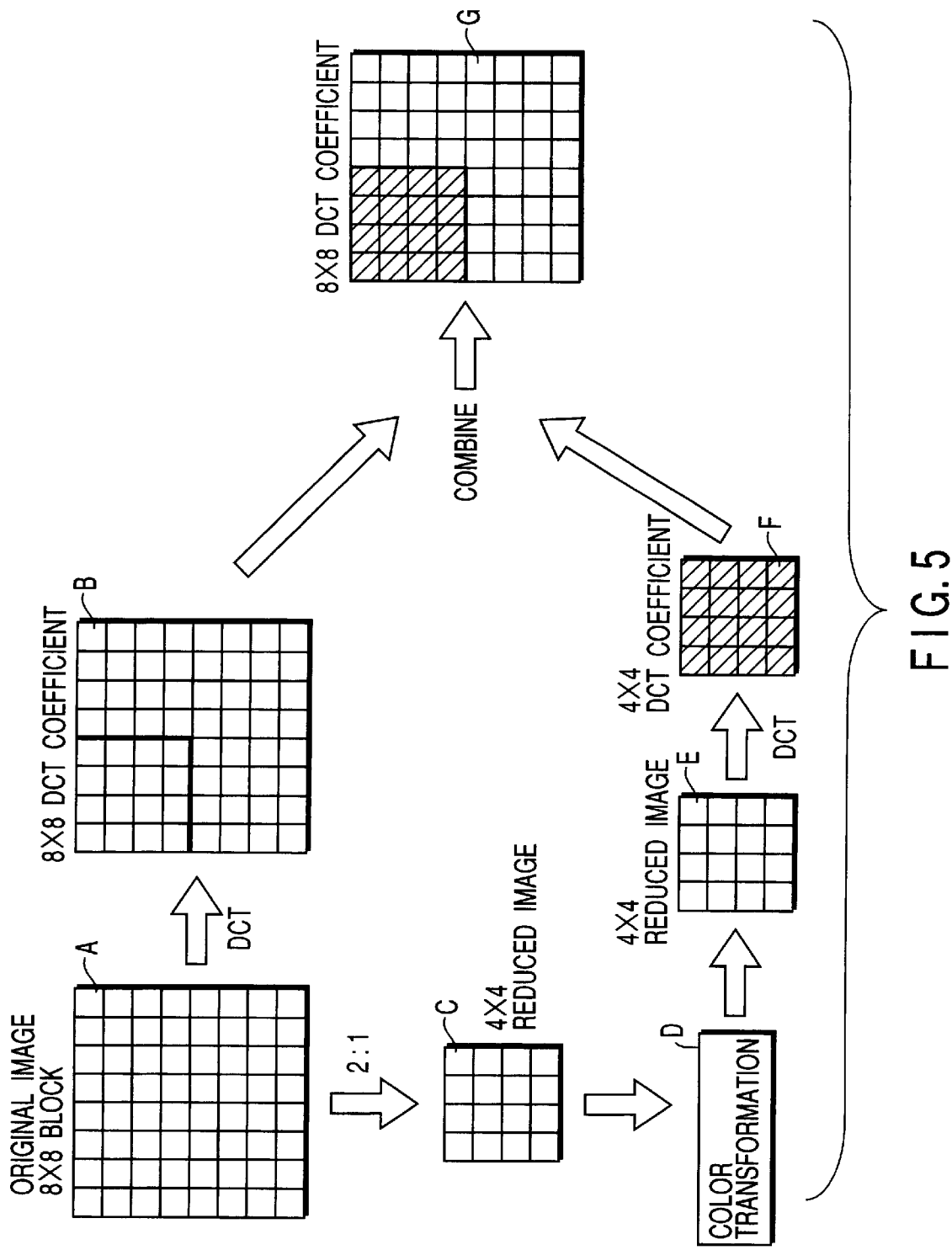
FIG. 5 is a diagram for describing a color transformation and compression procedure in the image processing apparatus according to the first embodiment.

FIG. 5 shows a specific example of a color transformation and compression process using the DCT as frequency control.

An original image is divided at each 8×8 pixels block, one block is cut out from the divided blocks, and the cut out block A which consists of 8×8 pixels is sent to each of the high- and low-frequency component processing sections. The high-frequency processing section applies the DCT to the block A of 8×8 pixels to determine 8×8 DCT coefficients. In the low-frequency component processing section, the block A of 8×8 pixels is subjected to a filtering process of the LPF and the sub-sampling process to produce, for example, a 4×4 reduced image C. The 4×4 reduced image C is then subjected to a color transformation process D to produce a color-transformed 4×4 reduced image E. The DCT is applied to the color-transformed 4×4 reduced image E to determine 4×4 DCT coefficients F. The 4×4 DCT coefficients F are embedded in the 8×8 DCT coefficients B as 4×4 DCT coefficients for the upper left (low frequency part) of the block which constitute low-frequency components within the 8×8 DCT coefficients B. This combine process produces an 8×8 DCT coefficients G of the original image which cover both the high and low frequencies.

This process is repeated for all divided blocks of 8×8 pixels in the original image.

With this simultaneous compression and color transformation processing of separately subjecting the low- and high-frequency component sides to the frequency transformation process and executing color transformation only to the low-frequency components, which more significantly affect image quality, without executing color transformation on the high-frequency components, the number of color transformation target pixels can be reduced to increase the processing speed without seriously degrading image quality.

Example of Division into Low- and High-Frequency Components in the DCT

FIGS. 6A to 6E shows an example of division into low- and high-frequency components in the case of the DCT.

If a block of 8×8 pixels is transformed by the DCT, even a frequency area is divided into 8×8 components, as described above. In FIGS. 6A to 6E, each unit square indicates one frequency component, and in the horizontal direction, more rightward components indicate higher frequencies, while in the vertical direction, more downward components indicate higher frequencies.

In FIGS. 6A to 6E, the shaded components indicate low-frequency components for color transformation.

Figure 6A:
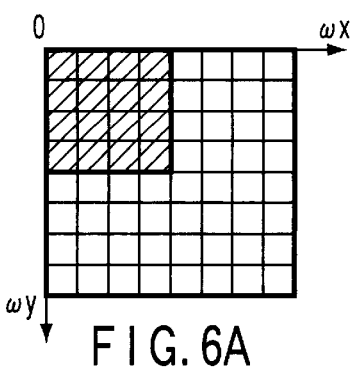
FIGS. 6A to 6E show a first example of division between low and high frequency components in the image processing apparatus according to the first embodiment.
Figure 6B:
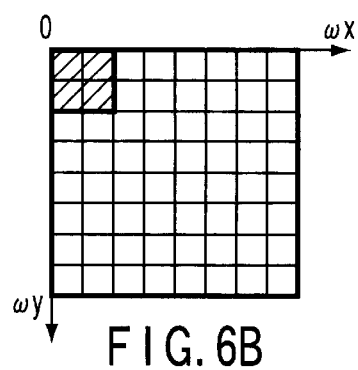
Figure 6C:
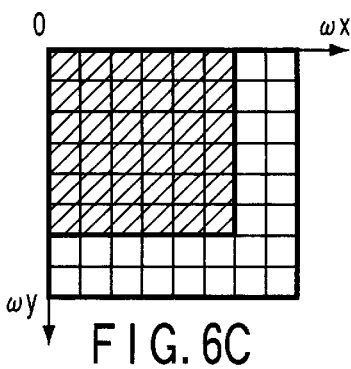

FIGS. 6A and 6B show a method of using a square to divide an image into low and high frequencies. FIG. 6A corresponds to the example described in FIG. 5. Both in the vertical and horizontal directions, components of frequencies lower than or equal to a maximum frequency are selected as color transformation targets. In calculating these components, an original image is sub-sampled in the ratio of 2:1 to obtain a reduced image of a ¼ size, which is then subjected to color transformation, followed by the DCT. In this case, the LPF preferably passes frequencies lower than or equal to the maximum frequency both in the vertical and horizontal directions. In this manner, by executing color transformation to an image sub-sampled in the ratio of 2:1 and then calculating frequency components, the amount of calculations required for color transformation is reduced to ¼ (½ in each of the vertical and horizontal directions). Likewise, in FIG. 6B, 4:1 sub-sampling can be provided to reduce the amount of calculations to ¹⁄₁₆.

Although boundaries can in principle be provided at locations corresponding to the square of two, the sampling ratio in this case is 4:3 and the sampling process requires interpolation (the values of coordinates at x=¾ must be calculated by means of interpolation using the values x=1 and x=2), preventing a high efficiency from being achieved.

Figure 6D:
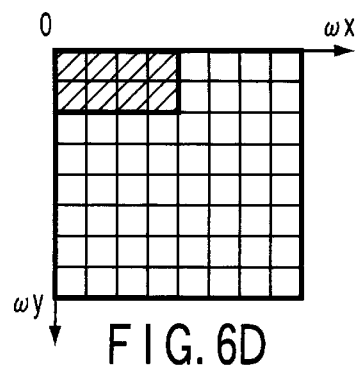

FIG. 6D shows a method of using a rectangle for selection, which is effective in the case where, for example, horizontal information has a special meaning. In this case, the amount of calculations for color transformation is diminished to ¼ in the vertical direction ad to ½ in the horizontal direction, that is, to ⅛ in total.

Figure 6E:
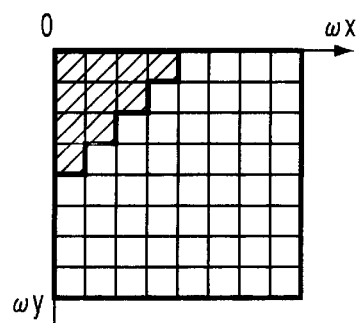

FIG. 6E shows a method of using a triangle for selection. With this method, the theoretical amount of calculations is the same as in FIG. 6A, and image quality is slightly degraded. This method, however, may be effective for implementations because the components are coded in a run length manner in this order during JPEG code generation.

Example of Division into Low- and High-Frequency Components in the Wavelet Transformation)

Figure 7A:
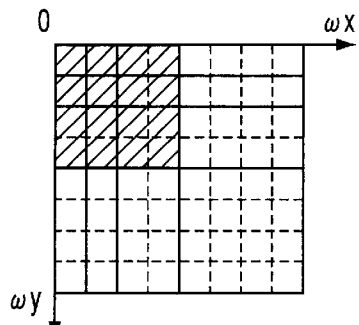
FIGS. 7A and 7B show a second example of division between low and high frequency components in the image processing apparatus according to the first embodiment.
Figure 7B:
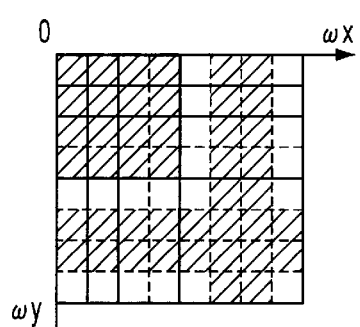

FIGS. 7A and 7B show an example of division into low- and high-frequency components in the case where the Wavelet transformation is used.

In the figures, the solid lines separate frequencies from one another, while the broken lines separate spatial positions in the frequency from one another. The figures show the case of 8×8 pixels.

Since the Wavelet transformation does not necessarily require block division, the coefficient actually handles larger squares or rectangles.

The selection of low-frequency components is essentially the same as in the DCT and may involve squares, rectangles, triangles, etc. Basically, the solid line portions define the boundaries. However, it is not totally meaningless that the broken line portions define the boundaries, and this is effective when an image partly having a high quality is desired. For example, in the example in FIG. 7B, a central portion of the image has a higher quality.

The image quality in this case is slightly lower than in the conventional all-pixel color transformation for the following two reasons:

(1) Since color transformation is not applied to high-frequency components, corresponding correction errors may occur.

(2) When a sub-sampled image is reproduced to the size of an original image, missing pixels are interpolated by the LPF. The color transformation, however, is not linear, so that accurate correction colors are not always provided. For example, in a 2:1 sampled image, the RGB values of adjacent pixels are assumed to be (100, 0, 0) and (110, 0, 0) before color transformation and (102, 0, 0) and (114, 0, 0) thereafter, a pixel to be reproduced at the intermediate point therebetween has, for example, a RGB value of (108, 0, 0) according to the proposed method, but strictly speaking, a transformed color for (105, 0, 0) should be placed at this portion and does not always correspond to (108, 0, 0).

For (1), however, since "high-frequency components inherently have small values" and "errors concerning high-frequency components are less perceivable to human beings", the correction error poses no practical problem. In addition, for (2), neighborhood colors remain as neighborhood colors after transformation, whereby the above error virtually poses no problem unless the variation in color between samples has a large absolute value.

Second Embodiment

Figure 8:
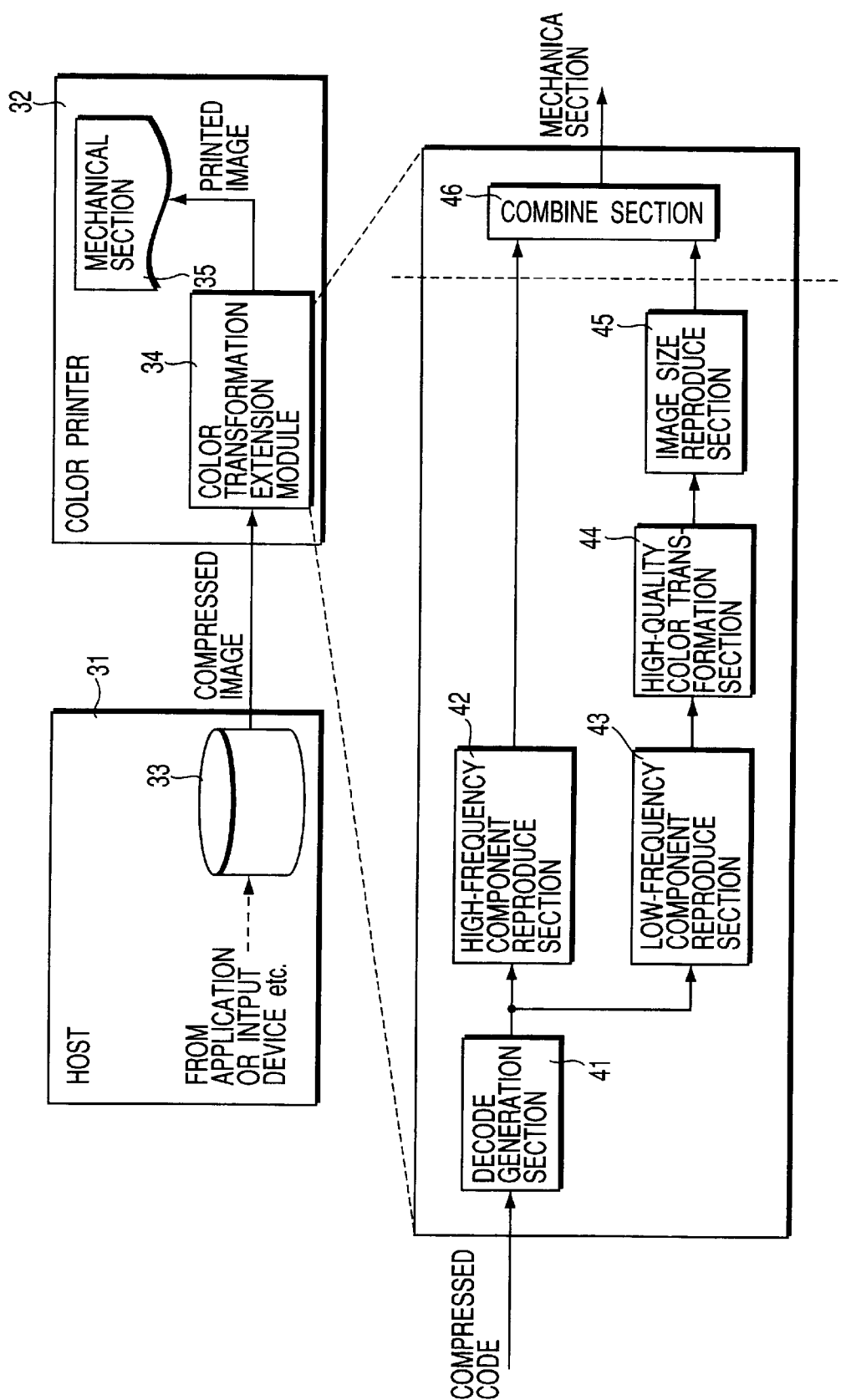
FIG. 8 is a block diagram showing an example of a configuration of an image processing apparatus according to a second embodiment of the present invention.

FIG. 8 shows a configuration of an image processing apparatus according to a second embodiment of the present invention. A color printer system will be illustrated and described which is comprised of a host computer 31 and a color printer 32. A disk device 33 in the host computer 31 saves images produced by an application program or image data input by an input device such as a scanner or a camera, after these images or data have been compressed and coded based on the JPEG or the like. This compressed image data is transmitted to a color expansion module 34 in a color printer 32 via a recording or communication medium. The color transformation and expansion module 34 may reside on the host side.

The color transformation and expansion module 34 executes a color transformation and expansion process on compressed image data for simultaneous color transformation and expansion. The color transformation process includes color transformation for color corrections that are compatible with the device characteristics of the color printer 32, color transformation for obtaining images that meet a user's liking, or color transformation for transforming a color space between RGB and CMY. In addition, the expansion process decodes image data compressed by means of a compression method based on the JPEG or the like in order to produce a printed image. This printed image is sent to a printer mechanical section 35 to print it out.

With the color transformation and expansion process executed by the color transformation and expansion module 34, in expanding an image compressed using frequency transformation, the following method is used: When low-frequency components are expanded, inverse frequency transformation (inverse DCT) is performed to obtain a sub-sampled image, which is then subjected to color transformation. When high-frequency components are expanded, color transformation is not executed.

Color Transformation and Expansion Module

The color transformation and expansion module 34 is comprised of a decode generation section 41, a high-frequency component reproduce section 42, a low-frequency component reproduce section 43, a high-quality color transformation section 44, an image size reproduce section 45, and a combine section 46.

Compressed and coded image data is subjected to variable decoding and inverse quantization by the decode generation section 41 so as to be decoded into frequency coefficient (DCT coefficients or the like). The frequency coefficient are passed to each of a high-frequency reproduce processing section (in the upper part of the figure) and a low-frequency reproduce processing section (in the lower part of the figure). The high-frequency component reproduce section 42 excludes low-frequency components from the frequency coefficient and then performs inverse frequency control to the remaining frequency coefficient to obtain an image corresponding to the high-frequency coefficient. The low-frequency component reproduce section 43 first extracts low-frequency components from the frequency coefficient and then performs inverse frequency control to the low-frequency coefficient. This reproduce operation provides a reduced image with a smaller number of pixels. The reduced image is subjected to an advanced (meaning a large amount of calculations) color transformation by the high-quality color transformation section 44 and then sent to the image size reproduce section 45. In the section 45, the sent image is subjected to interpolation processes by using an appropriate LPF so as to reproduce the size of the original image.

A final reproduced image is obtained by using the combine section 46 to combine the images produced through the two flows. The method of division into low- and high-frequency components and its effects are similar to those in Embodiment 1.

Figure 9:
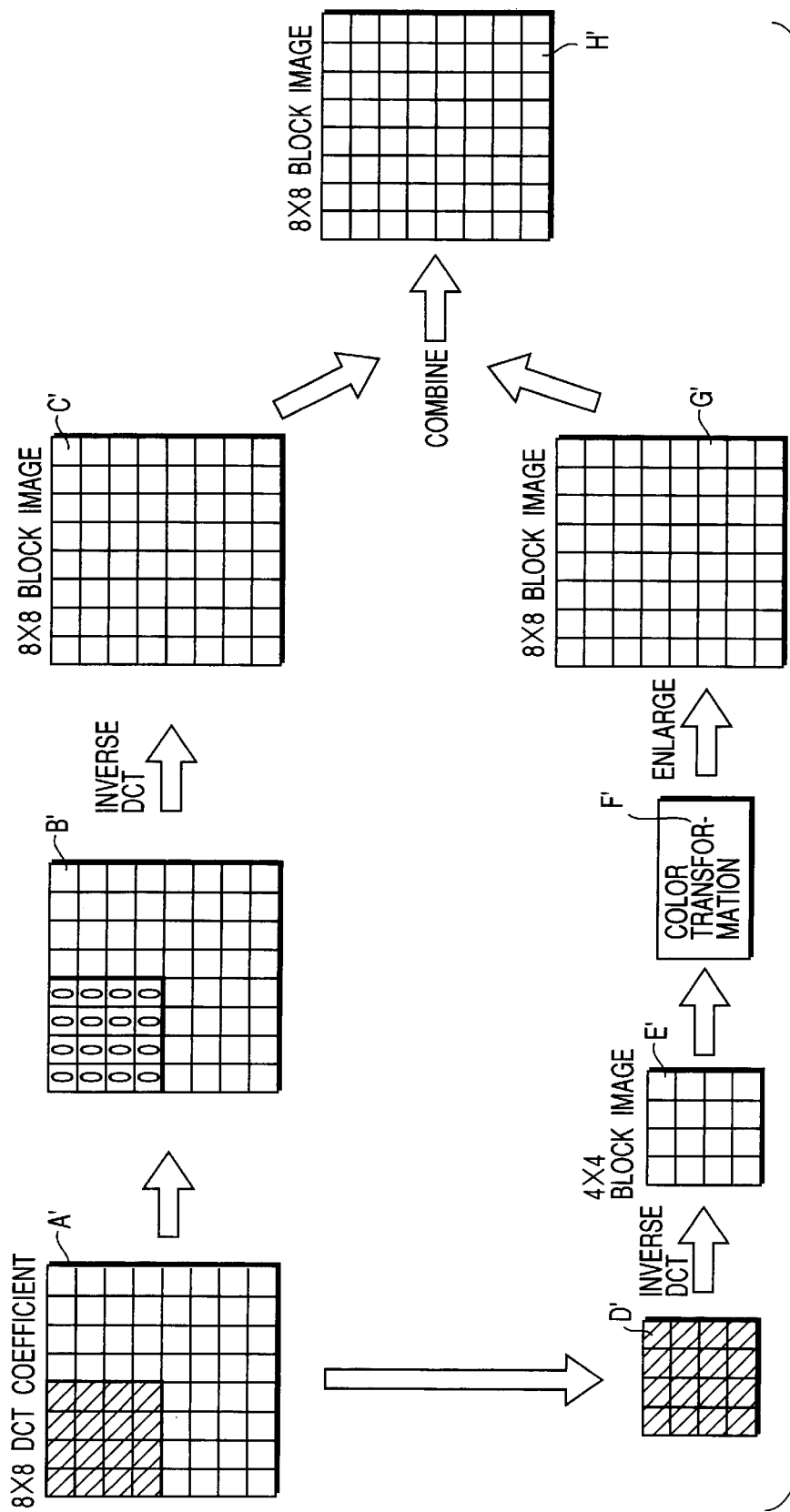
FIG. 9 is a diagram for describing a color transformation and expansion procedure in the image processing apparatus according to the second embodiment.

FIG. 9 shows a specific example of a color transformation and expansion process using the DCT as frequency transformation.

Eight×eight DCT coefficients A' of compressed and coded image data are transmitted to each of the high- and low-frequency component processing sections. The high-frequency component processing section first replaces, for example, all the 4×4 DCT coefficients in the upper left of the 8×8 DCT coefficients A' with zero to generate 8×8 DCT coefficients B' free from the low-frequency components. The inverse DCT is then applied to the 8×8 DCT coefficients Be free from the low-frequency components to obtain a block image C' of 8×8 pixels. The low-frequency component processing section extracts low-frequency components from the 8×8 DCT coefficients A' to obtain 4×4 DCT coefficients D' in the lower left of the image data. The inverse DCT is applied to the 4×4 DCT coefficients D' to generate a reduced image E' of 4×4 pixels. A color transformation process F' is executed on the 4×4 reduced image E', and the color-transformed 4×4 reduced image is then enlarged by means of interpolation to obtain a block image G' of 8×8 pixels. The block images C' and G' of 8×8 pixels each are added together to obtain a final reproduced image H'.

This process is repeated for each block of 8×8 DCT coefficients.

Thus, in expanding a compressed and coded image, the number of color transformation target pixels can also be reduced to increase the processing speed without degrading image quality, using the above simultaneous expansion and color transformation processing of separately subjecting the low- and high-frequency component sides to the inverse frequency transformation process and executing color transformation only to the low-frequency components, which more significantly affect image quality, without executing color transformation on the high-frequency components.

Third Embodiment

Next, as a third embodiment, a method will be described which is used to execute color transformation and expansion to image data hierarchically coded using a hierarchical mode.

In this case, the color transformation and expansion module 34 comprises three decode and inverse DCT sections 51, 52, 53, an image size reproduce section 54, a combine section 55, a high quality color transformation section 56, an image size reproduce section 57 and a combine section 58 as shown in FIG. 10.

Figure 11:
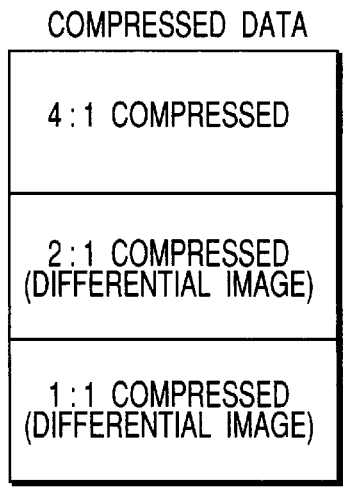
FIG. 11 is a diagram showing the structure of hierarchically coded image data to be expanded according to the third embodiment.

Coded and compressed image data transmitted and received in the hierarchical mode is comprised of, e.g. as shown in FIG. 11, coded and compressed images which are sampled at a plurality of sampling rates.

In FIG. 10, low resolution 4:1 compressed image data is decoded by the decode and inverse DCT section 51 to reproduce low resolution 4:1 compresses image data having quarter size of the original image. Medium resolution 2:1 compressed image data is decoded by the decode and inverse DCT section 52 to reproduce difference image data having half size of the original image. Furthermore, high resolution 1:1 compressed image data is decoded by the decode and inverse DCT section 53 to reproduce difference image data having same size of the original image. A size of the low resolution 4:1 compressed image data output from the decode and inverse DCT section 51 is enlarged to a size thereof by 2 times to output it into the combine section 55. In the combine section 55, the image data of which a size is enlarged by 2 times and medium resolution 2:1 difference image data output from the decode and inverse DCT section 52 are combined with each other. The image data combined by the combine section 55 is subjected to highly color transformation processing in the high quality color transformation section 56. And then, the image data which is subjected to color transformation processing is transformed such that a size thereof is same size of the original image in the image size reproduce section 57. In the combine section 58, high resolution 1:1 difference image data output from the decode and inverse DCT section 53 and image data output from the image size reproduce section 57 are combined with each other, thereby generating a complete reproduce image.

With the above described embodiment, 4:1 compressed image data and 2:1 compressed image data are subjected to color transformation processing as an example, but this invention is not limit to this. For example, only 4:1 compressed image data may be subjected to color transformation processing. In this case, in FIG. 10, a structure should be adopted in which the combine section 55 should be deleted, and the image data, of which a size is enlarged to a size by 2 times, output from the image size reproduce section 54 and medium resolution 2:1 difference image data, of which a size is enlarged to a size by 2 times by image size reproduce section (not shown), output from the decode and inverse DCT section 52 should be input to the high quality color transformation section 56.

Fourth Embodiment

Next, a sampling rate switching method applied to the color transformation and expansion module 34 according to the second embodiment will be explained as a fourth embodiment.

In this case, the color transformation and expansion module 34 additionally has a frequency component division determination section 61 as shown in FIG. 12. The frequency component division determination section 61 essentially divides the frequency coefficient of compressed and coded image data at a certain boundary into a low- and a high-frequency areas, but this example changes this boundary depending on a processed image.

That is, in the second embodiment, image data is fixedly divided into low- and high-frequency components areas using a method similar to that of first embodiment. Although color transformation errors may occur due to the lack of the color transformation of high-frequency components as described above, the color errors tend to increase linearly with the magnitude of high-frequency components.

Thus, in this embodiment, a method of increasing the number of color transformation target pixels, for blocks (8×8 blocks or the like) with high frequency components of a large magnitude is adopted.

A specific example of a procedure is shown below.

Figure 13A:
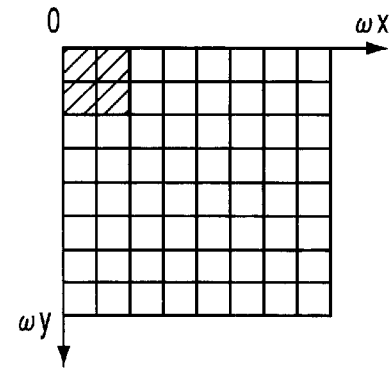
FIGS. 13A to 13C is a diagram for describing a low/high frequency boundary determination processing method according to the fourth embodiment.

First, in a default, an area of low-frequency components are selected as shown by the shaded portion in FIG. 13A. If an area of high-frequency components, which is not shaded portion, have no large DCT coefficient value, the image data is divided in this condition. In this case, the image is subjected to color transformation in the ratio of 4:1 both in the vertical and horizontal directions, and the amount of calculations corresponds to 1/16 of the image data.

Figure 13B:
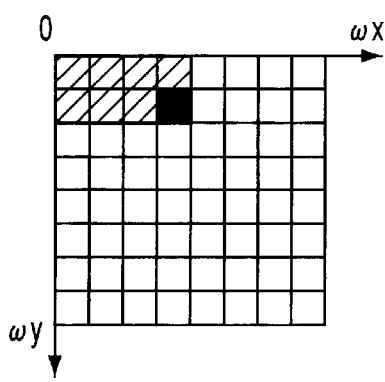
Figure 13C:
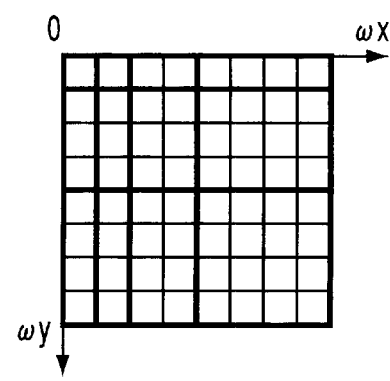

If the filled area in FIG. 13B has a large DCT coefficient value, then the shaded area in FIG. 13B is classified into the area of low-frequency components. In this case, the image is subjected to color transformation in the ratios of 4:1 in the vertical direction and of 2:1 in the horizontal direction, and the amount of calculations corresponds to ⅛ of the image data. That is, an area of low-frequency components is selected so as to define an area having large DCT coefficient value by a rectangle. The sampling interval varies depending on the boundaries shown by the thick lines in FIG. 13C, a rectangle may be selected based on these boundaries.

Determination of the magnitude of high-frequency components includes:

comparison of each component with a threshold and
comparison the sum (or square sum) of values in a partial rectangle with a threshold value.

When a color image is used, 8×8 pixels exist in each RGB so that these pixels may be added together.

In this manner, the frequency component division determination section 61 dynamically determines a boundary position for each block.

Fifth Embodiment

Next, a sampling rate switching method (Wavelet) applied to the color transformation and expansion module 34 according to the second embodiment will be described as a fifth embodiment.

FIG. 14 shows a configuration of the color transformation and expansion module 34 to which the sampling rate switching method (Wavelet transformation) is applied. The color transformation and expansion module 34 has a component division rate determination section 62 in addition to the structure of the second embodiment.

The component division rate determination section 62 carries out essentially the same processing as in Embodiment 4 and provides such control as to increase a color transformation target area if any high-frequency component has a large value. According to the Wavelet transformation, fixed spatial division is avoided in contrast to the DCT, which uses blocks of 8×8 pixels for such division, and components individually correspond to a certain area on a space, so that the components can be divided more flexibly than in the DCT.

Figure 15:
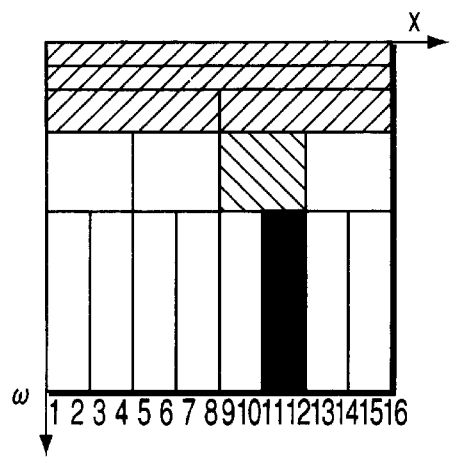
FIG. 15 is a diagram for describing a low/high frequency boundary determination processing method according to the fifth embodiment.

FIG. 15 shows an example of component division. For simplification, this figure shows an example of one dimension and sixteen pixels.

Standard low-frequency components are indicated by the shaded portion (//) and a high-frequency component of a large value exists in the filled portion. The shaded components are passed to the low-frequency reproduce section, where they are subjected to color transformation at the sampling rate of 4:1 and then reproduced to the original image size. Further, the coefficient of the filled portion and lower-frequency components including the same position as this coefficient (the reversely shaded portion) are also passed to the low-frequency reproduce section, where they are subjected to color transformation (the color transformation cannot be calculated correctly without the reversely shaded portion) and the relevant portion is reproduced to the original image size. This partial image is replaced for the corresponding portion of the recovered low-frequency image. (In fact, the range of the relevant portion varies depending on the selection of Wavelet base functions.)

The other portions (white portions) are passed to the high-frequency reproduce section, where they do not undergo color transformation.

In this manner, if any high-frequency component has a large value, the boundary is changed so as to include the frequency component value of the corresponding spatial position within the color transformation target. Consequently, a more accurate color transformation can be applied to important portions.

The color transformation and compression process and color transformation and expansion process described in each of the above embodiments can be implemented either by hardware or by software. If the processes are implemented by software, the processing procedure corresponds to the flow of processing described in the block diagrams. In addition, color transformation parameters may be determined beforehand depending on the characteristics of the device, but color transformation can be performed to a user's liking by providing a function of changing the parameters in accordance with the user's operations.

As described above, according to the present invention, the image compression or expansion process and the color transformation process are simultaneously executed to enable the number of color transformation target pixels to be reduced without significantly degrading image quality, thereby realizing vary fast processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:

reduced image production means for producing reduced image data from original image data;

color transformation means for transforming color of the reduced image data obtained by the reduced image production means;

first frequency transformation means for executing frequency transformation to the reduced image data subjected to color transformation by the color transformation means in order to determine low-frequency coefficient of the original image data;

second frequency transformation means for executing frequency transformation to the original image data to determine high-frequency coefficient of the original image data;

means for combining the low-frequency coefficient determined by the first frequency transformation means and the high-frequency coefficient determined the second frequency transformation means in order to generate frequency coefficient of the original image data; and coding means for coding the generated frequency coefficient of the original image.

2. An image processing apparatus according to claim 1, wherein the reduced image production means comprises a low pass filter and means for sampling the original image data which is passed through the low pass filter.

3. An image processing apparatus according to claim 1, wherein the frequency transformation executed on the reduced image data by the first frequency transformation means and the frequency transformation executed on the original image data by the second frequency transformation means are performed in accordance with a discrete cosine transformation.

4. An image processing apparatus according to claim 1, wherein the frequency transformation executed on the reduced image data by the first frequency transformation means and the frequency transformation executed on the original image data by the second frequency transformation means are performed in accordance with a Wavelet transformation.

5. An image processing apparatus comprising:

means for decoding compressed and coded image data to obtain frequency coefficient of the compressed and coded image data;

first image data generation means for executing inverse frequency transformation to low-frequency coefficient of the obtained frequency coefficient of the compressed and coded image data to generate reduced image data;

color transformation means for executing color transformation on the reduced image data obtained by the first image data generation means;

image data size reproduce means for reproducing the reduced image data subjected to the color transformation by the color transformation means, to a size of the original image data;

second image data generation means for executing inverse frequency transformation to the frequency coefficient of the compressed and coded image data other than the low-frequency coefficient to generate image data; and means for combining the image data obtained by the image size reproduce means with the image data obtained by the second image data generation means in order to generate a decoded image of the compressed and coded image data.

6. An image processing apparatus according to claim 5, further comprising boundary setting means for setting a boundary that divides the obtained frequency coefficient of the compressed and coded image data into low- and high-frequency coefficient based on a level of the obtained frequency coefficient of the compressed and coded image data, for outputting low-frequency coefficient of the obtained frequency values of the compressed and coded image data to the first image data generation means, and for outputting high-frequency coefficient of the obtained frequency values of the compresses and coded image data to the second image data generation means based on the boundary.

7. An image processing apparatus according to claim 5, wherein the inverse frequency transformation executed on the low-frequency coefficient by the first image data generation means and the inverse frequency transformation executed on the frequency coefficient of the compressed and coded image data except for the low-frequency coefficient are performed in accordance with a inverse discrete cosine transformation.

8. An image processing apparatus according to claim 5, wherein the inverse frequency transformation executed on the extracted low-frequency coefficient by the first image data generation means and the inverse frequency transformation executed on the frequency coefficient of the compressed and coded image data except for the low-frequency coefficient are performed in accordance with a inverse Wavelet transformation.

9. An image processing apparatus comprising:

means for decoding each of plural image data having different resolutions with each other which are contained in hierarchically coded image data to generate decoded image data;

color transformation means for executing color transformation to the generated decoded image data obtained from a low resolution image data in the plurality of image data having different resolutions;

image size reproduce means for reproducing the decoded image data subjected to the color transformation processing by the color transformation means, to a original image data size; and means for generating a decoded image of the hierarchically coded image data by combining image data having a high resolution other than the image data having a low resolution of the plurality of image data having different resolutions with the decoded image data obtained by the image size reproduce means.

10. An image processing method comprising:

generating reduced image data;

executing color transformation on the reduced image data;

executing frequency transformation to the color-transformed reduced image data to obtain low-frequency coefficient of the original image data;

executing frequency transformation to the original image data in order to obtain high-frequency coefficient of the original image data;

combining the low-frequency coefficient and the high-frequency coefficient to generate frequency coefficient of the original image data; and coding the generated frequency coefficient of the original image data.

11. An image processing method comprising:

obtaining frequency coefficient of compressed and coded image data by decoding the compressed and coded image data;

generating reduced image data by executing inverse frequency transformation to low frequency component in the obtained frequency coefficient of compressed and coded image data;

executing color transformation on the generated reduced image data;

reproducing the color-transformed reduced image data to first image data of which a size equals to an original image data size;

executing inverse frequency transformation to frequency coefficient of the compressed and coded image data other than the low-frequency coefficient to generate second image data; and combining the first image data with the second image data to generate a decoded image of the compressed and coded image data.

12. An image processing method according to claim 11, wherein the step of obtaining frequency coefficient divides the obtained frequency coefficient of the compressed and coded image data into low frequency coefficient and high frequency coefficient based on a level of the obtained frequency coefficient.

13. An image processing method comprising:

decoding each of plurality of image data having different resolutions with each other which are contained in hierarchically coded image data to generate decoded image data;

executing color transformation to the decoded image data obtained from a low resolution image data in the plurality of image data having different resolutions;

reproducing the color-transformed decoded image data to an original image data size; and generating a decoded image of the hierarchically coded image data by combining a high resolution decoded image data other than the low resolution image data of the plurality of image data having different resolutions with the reproduced image data.

* * * * *

UNITED STATES PATENT AND TRADEMARK OFFICE
CERTIFICATE OF CORRECTION

PATENT NO. : 6,738,169 B1 Page 1 of 1
DATED : May 18, 2004
INVENTOR(S) : Nakase

It is certified that error appears in the above-identified patent and that said Letters Patent is hereby corrected as shown below:

<u>Column 16,</u>
Lines 27 and 35, change "a inverse" to -- an inverse --.
Line 47, change "a original" to-- an original --.

Signed and Sealed this

Sixth Day of July, 2004

JON W. DUDAS
*Acting Director of the United States Patent and Trademark Office*